United States Patent
Koeger et al.

(10) Patent No.: US 12,208,290 B2
(45) Date of Patent: Jan. 28, 2025

(54) NBC FILTRATION SYSTEM WITH AIR EXCHANGE BACKUP UNIT

(71) Applicant: BETH-EL ZIKHRON YAAQOV INDUSTRIES LTD., Zikhron Yaaqov (IL)

(72) Inventors: Samuel Koeger, Zikhron Yaaqov (IL); Jonathan Schneider, Zikhron Yaaqov (IL)

(73) Assignee: BETH-EL ZIKHRON YAAQOV INDUSTRIES LTD., Zikhron Yaaqov (IL)

( * ) Notice: Subject to any disclaimer, the term of this patent is extended or adjusted under 35 U.S.C. 154(b) by 898 days.

(21) Appl. No.: 17/263,174

(22) PCT Filed: Mar. 14, 2019

(86) PCT No.: PCT/IL2019/050293
§ 371 (c)(1),
(2) Date: Jan. 26, 2021

(87) PCT Pub. No.: WO2020/031169
PCT Pub. Date: Feb. 13, 2020

(65) Prior Publication Data
US 2021/0178197 A1    Jun. 17, 2021

(30) Foreign Application Priority Data
Aug. 9, 2018 (IL) .......................... 261094

(51) Int. Cl.
*A62B 11/00* (2006.01)
*B01D 46/42* (2006.01)
*F16H 7/02* (2006.01)

(52) U.S. Cl.
CPC .............. *A62B 11/00* (2013.01); *B01D 46/42* (2013.01); *F16H 7/023* (2013.01)

(58) Field of Classification Search
CPC ......... A62B 11/00; A62B 23/04; A62B 13/00; B01D 46/42; B01D 2267/40; F16H 7/023; E04H 9/04; B25J 15/00; B25J 19/00
(Continued)

(56) References Cited

U.S. PATENT DOCUMENTS 3,107,048 A * 10/1963 Wentling ............... A62B 13/00
                                                         417/372
2013/0294916 A1* 11/2013 Himmelmann
(Continued)

FOREIGN PATENT DOCUMENTS

JP          5327401 B1 * 10/2013   ........... E04H 1/1277
WO    2018/015943       1/2018

*Primary Examiner* — Robert A Hopkins
*Assistant Examiner* — Qianping He
(74) *Attorney, Agent, or Firm* — The Law Office of Joseph L. Felber

(57) ABSTRACT

A near ceiling mounted NBC filtration system of collective protection shelters comprising a filter unit, a blower, and an air exchange backup unit [20] (FIG. 5). The air exchange backup unit [20] comprising: a plurality of hinged segments [22a, b, c] serially linked to each other to form a foldable arm. The hinged segments [22a, b, c] are configured for transmission of rotational motion between each other. At least one of the hinged segments comprises at least one stage of a first speed increasing transmission. A first end [24] of the air exchange backup unit is swiveably attached to an electric motor [42] driving a blower [40]. And a second end [26] of the air exchange backup unit carries a detachable hand crank [28]. Manual rotation of the hand crank [28] rotates a shaft of the electric motor [42] at substantially a rated speed of the electric motor. The second end [26] of the air exchange backup unit is firmly attachable to a wall of the protection shelter at a convenient position for manual crank-
(Continued)

ing of the hand crank [28]. The air exchange backup unit [20] is selectively folded up at normal times.

19 Claims, 12 Drawing Sheets

(58) Field of Classification Search
USPC .......................................................... 55/385.2
See application file for complete search history.

(56) References Cited

U.S. PATENT DOCUMENTS

| 2016/0263742 | A1* | 9/2016 | Hosek | ...................... | B25J 9/042 |
| 2017/0334517 | A1* | 11/2017 | Zuniga | ...................... | B62M 1/36 |
| 2019/0282841 | A1* | 9/2019 | Koeger | ...................... | E04H 9/04 |

* cited by examiner

NBC FILTRATION SYSTEM WITH AIR EXCHANGE BACKUP UNIT

FIELD OF THE INVENTION

The present invention relates to an NBC filtration system of collective protection shelters. More particularly to an NBC filtration system provided with an air exchange backup unit.

BACKGROUND OF THE INVENTION

In Israel, public constructions such as office buildings, shopping malls, industrial facilities, entertainment centers and the like, must preserve an NBC protected space for use at emergency. The protected space should include an NBC filtration system. The preserved space may be used for other periodical purposes at normal times. Commonly the space is used as meeting or waiting rooms that do not require heavy furniture and can be rapidly cleared during an emergency event. Due to the high cost per square meter of floor-space in such buildings, it is desired that the NBC filtration system would take up minimal space.

The regulations indicate that such public NBC filtration system should include a filter unit composed of a particulate filter and a gas adsorption filter, and an electric blower appropriate for certain rate of air exchange. Furthermore, the NBC filtration system should have an air exchange backup unit energized by human power, including a human power interface such as a hand crank for manual operation in an event of power failure. The air exchange backup unit introduces fresh air into the protection shelter using human power instead of electric power if such is not available. Typically, the air exchange backup unit includes a speed increasing gear having an input shaft manually rotated by the hand crank and an output shaft engaged to rotate the electric blower. The hand crank may be detachable in order to free space during normal times.

The term NBC, standing for "Nuclear Biological Chemical", is used here at the broad interpretation, meaning one or more of: Nuclear, Biological, Radiological and Chemical. Accordingly not all of the capabilities are necessarily implemented in a filtration system. For example a filtration system providing Biological and Chemical attack protection, but none or only partial Nuclear attack protection, is yet considered an NBC filtration system.

Israeli patent application 244631 suggests a ventilation and filtration system for a security room, including: a blower to blow air to ventilate the security room; an air filter that is connectable to the blower to filter the air; a housing within which the air filter and the blower are enclosable; and a mechanism for raising the housing to a storage position at the ceiling of the security room so as to enable utilization of a space beneath the housing, and for lowering the housing to an operating position at the floor of the security room.

The suggested solution however is cumbersome and requires lowering of the entire filtration system in an event of emergency. The entire system weight may reach 100 kg, and the lifting and lowering mechanism which must enable easy operation for an average person becomes complicated by itself.

Israeli patent application 246827 to the present applicant, also published as PCT/IL2017/050747 describes a floor-space saving and general space saving, simple to operate NBC filtration system for collective protection shelters. According to application 246827, the NBC filtration system is contained in a space located out of a comfortable reach of the shelter occupants thus saving usable floor-space, while the means for activation, manual operation and for changing the NBC filtration system state are operated from a location within the comfortable reach of the shelter occupants. The above application also suggests basic constructional options for implementation of the invention.

Specifically, there is suggested an option to operate the NBC filtration system, where the NBC filtration system and the air exchange backup unit is located higher than an average person height. The option suggests that the human power interface such as hand crank or foot pedals is remotely mechanically or electrically linked to the unreachable NBC filtration system.

The suggested air exchange backup unit is remotely powered by a hand crank located as a separate unit at the proper height for use by an average person. The hand crank is supported to the wall at one side and optionally supported with a detachable floor stand at the other side to firmly hold the hand crank during usage. Optionally, the hand crank could be fitted to the wall only using appropriate carrying capacity bearings such that floor stand is not needed. The power is transmitted through a mechanical power transmission means such as drive-belt or chain with pulleys or sprockets fitted on the hand crank and on the electric blower shaft.

However, in real installations it appears that the NBC filtration system is fitted at different locations and different heights. The different locations are enforced by variations in position of the intake pipe between building constructions. Such varying locations makes it difficult to use a single drive solution for different installations.

Additionally, the suggested chain or belt drive lowers the efficiency of the air blow system, being external and additional to the speed increasing gear. Furthermore, the solutions provided in application 246827 are principal while more specific constructional implementations are required.

Accordingly there is a need to further optimize the above prior art systems in order to enable efficient power saving operation, ease of installation in different construction sites and reduced maintenance costs.

SUMMARY OF THE INVENTION

Consequently, it is a principal object of the present invention to overcome the disadvantages and limitations of prior art systems and provide an NBC filtration system of collective protection shelters having an optimized structure of an air exchange backup unit. The proposed optimized structure provides efficient operation and integration of the various elements of the air exchange backup unit, while preserving flexibility of installation. As a result filtration systems can be easily installed at different positions and orientations using a single type of air exchange backup unit.

According to an embodiment of the invention, there is provided an NBC filtration system mounted at a near ceiling position, comprising: a filter unit, a blower airflow coupled to the filter unit, and an air exchange backup unit mechanically coupled to the blower. The air exchange backup unit comprising a plurality of hinged segments serially linked to each other to form a foldable arm. The hinged segments are configured for transmission of rotational motion between each other. A first end of the air exchange backup unit drives the blower and a second end of the air exchange backup unit carries a detachable hand crank. Manual rotation of the hand crank rotates an impeller of the blower. The air exchange backup unit is selectively folded up at normal times.

According to an aspect of the embodiment each of the hinged segments is provided with a mechanical drive transmitting rotational motion from one end of the segment to the other end.

According to another aspect of the embodiment each link pairing the hinged segment is provided with a rotatable shaft sharing the same axis as the hinge axis.

According to an aspect of the embodiment, at least one of the hinged segments further comprises at least one stage of a first speed increasing transmission.

According to another aspect, the first end of the air exchange backup unit is swiveably attached to an electric motor driving the blower. Manual rotation of the hand crank rotates a shaft of the electric motor at substantially a rated speed of the electric motor.

According to yet another aspect, the second end of the air exchange backup unit is firmly attachable to a wall of the protection shelter at a convenient position for manual cranking of the hand crank.

According to another aspect of the invention, a method of introducing fresh air into a protection shelter during an event of a power failure is provided. The method comprising one or more of the steps:

a. Providing a near ceiling mounted NBC filtration system comprising: a filter unit; a blower driven by an electric motor; an air exchange backup unit having a first end swiveably attached to said electric motor; and a detachable hand crank selectively fitted to a second end of said air exchange backup unit; said air exchange backup unit comprising a plurality of hinged segments serially linked to each other to form a foldable arm, the hinged segments are configured for transmission of rotational motion between each other.

b. Expanding the air exchange backup unit in an event of a power failure.

c. Attaching the second end of the air exchange backup unit to a wall of a protection shelter at a convenient position for manual cranking of said hand crank.

d. Attaching the detachable hand crank to the second end of the air exchange backup unit.

e. And cranking the hand crank while the power failure continues.

The method may further comprise one or more of the steps:

f. Stopping the cranking operation when electric power is revived.

g. Detaching the detachable hand crank from the second end of the air exchange backup unit.

h. Detaching the second end of the air exchange backup unit from the wall of the protection shelter.

i. And folding up the air exchange backup unit.

BRIEF DESCRIPTION OF THE DRAWINGS

The invention and a way it may be carried out in practice, will be understood with reference to the following illustrative figures, by way of non-limiting example only, in which like reference numerals identify like elements, and in which.

DETAILED DESCRIPTION OF EMBODIMENTS

Several terms relating to the present invention will be defined prior to describing the invention in detail. It should be noted that the following definitions are used throughout this application.

For the purpose of the present invention, directional terms such as "top", "bottom", "below", "above", "left", "right", "horizontal", "vertical", "upper", "lower", "up", "down", etc. are merely used for convenience in describing the various implementations of the present invention. The assemblies demonstrating the present invention may be oriented in various ways.

For the purpose of the present invention, the term "plurality" refers to two or more than two.

For the purpose of the present invention, the term "hinged element" refers to an element provided with at least one hinge or having at least one hinge point enabling swivel of the element about the hinge point.

For the purpose of the present invention, the term "segment" refers to one of the parts into which an assembly is separates or is divided.

For the purpose of the present invention, the term "air exchange backup unit" refers to a device, energized by human power, configured for introducing fresh air into a protection shelter during an event of electric power failure.

For the purpose of the present invention, the term "foldable" refers to a structure that can be folded down into a small space when it is not being used.

For the purpose of the present invention, the term "inverted tooth chain" or "silent chain" refers to a type of drive chain with teeth formed on its links to engage with standard or modified gear wheels.

For the purpose of the present invention, the term "pitch" refers to the distance between successive corresponding physical occurrences, such as rollers in a roller chain.

The term "NBC" is used throughout this text as a general abbreviate for all kinds of hazardous agents including any one of Nuclear, Biological, Chemical and Radiological threats or any combination thereof. Such combinations may include for instance: NBC, CBRN, CBR, BC, B and C.

Figure 1:
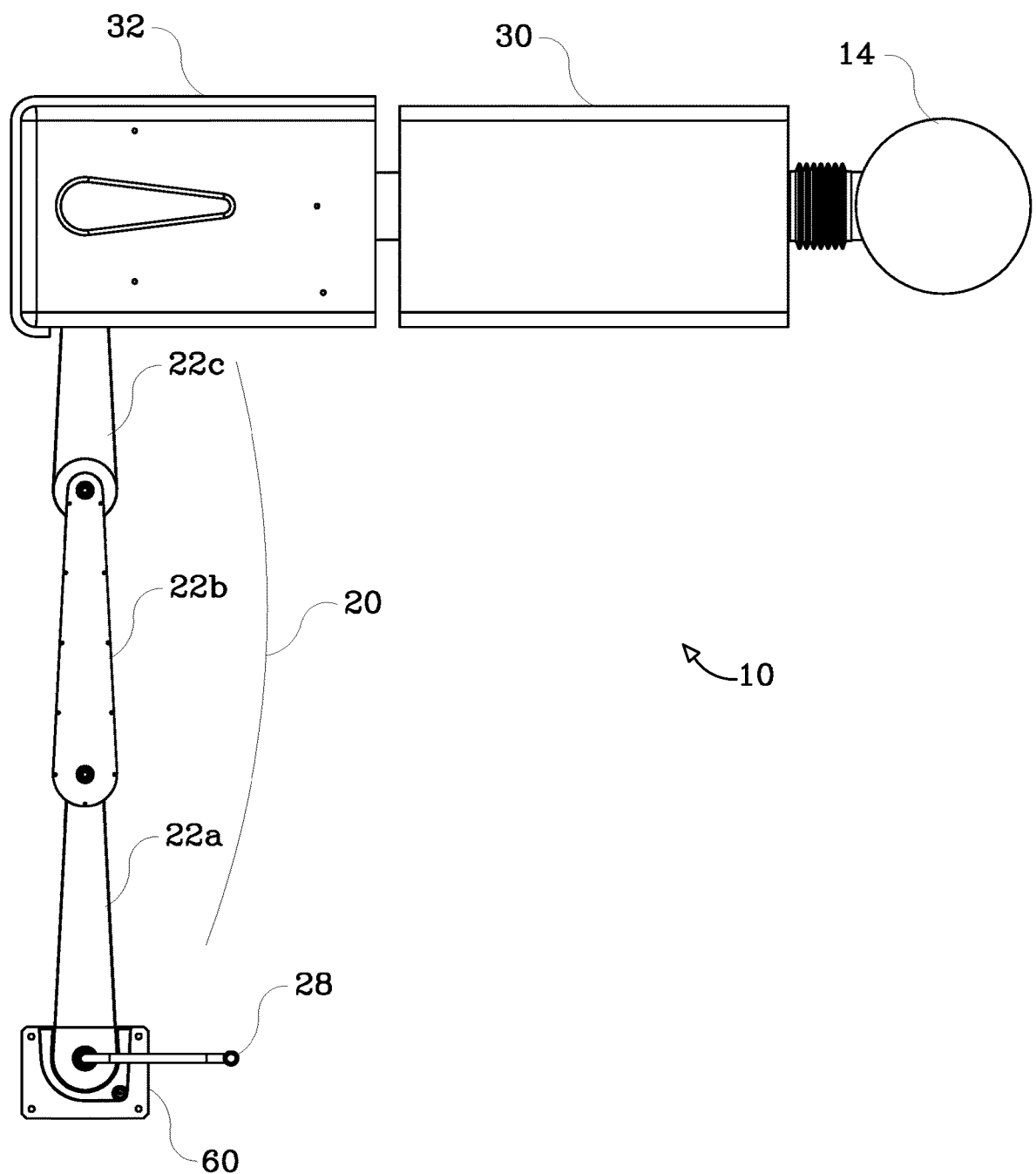
FIG. 1 is a front view of an NBC filtration system using an air exchange backup unit made according to an embodiment of the invention.
Figure 2:
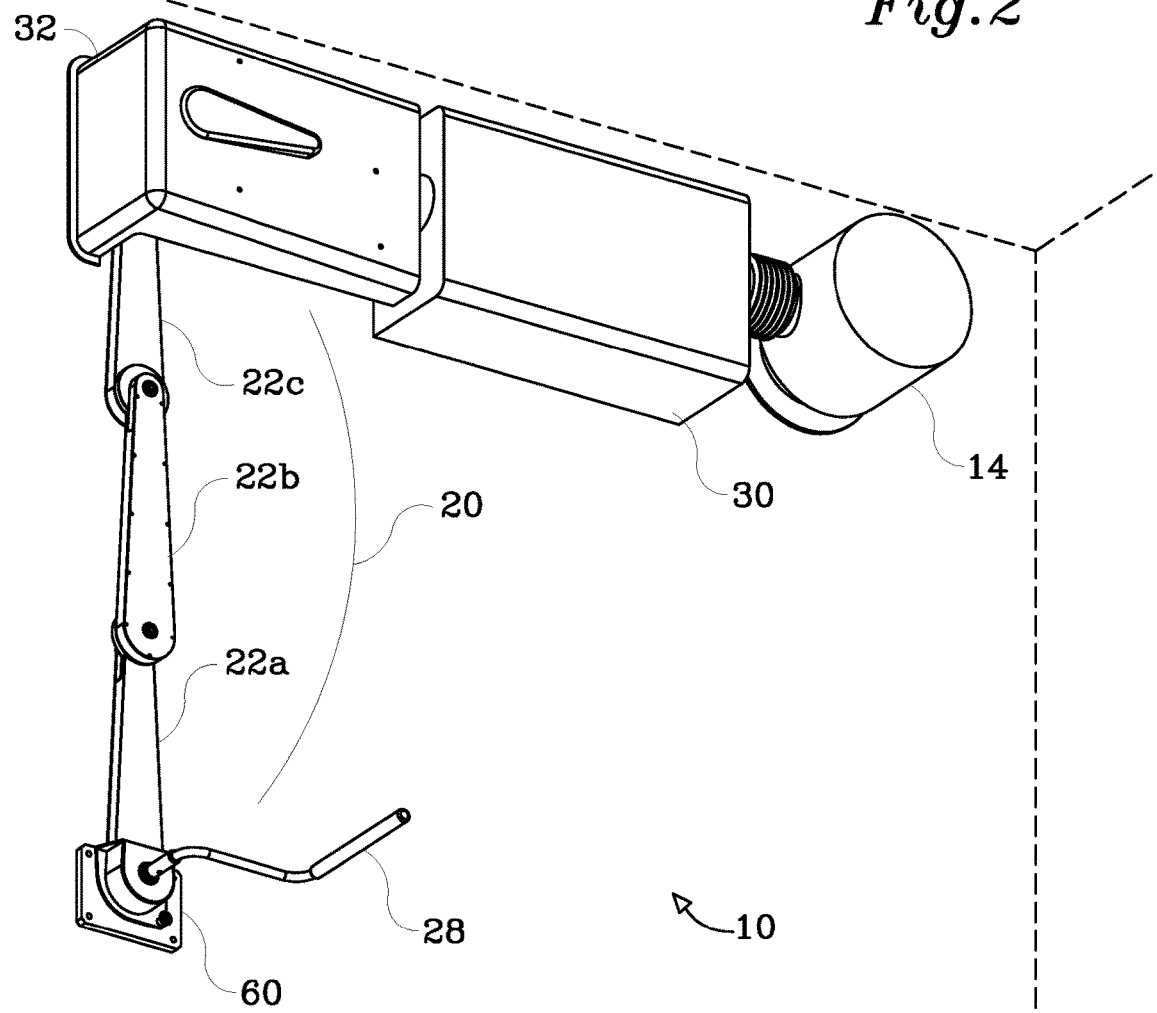
FIG. 2 is a perspective view of the NBC filtration system of FIG. 1.
Figure 4:
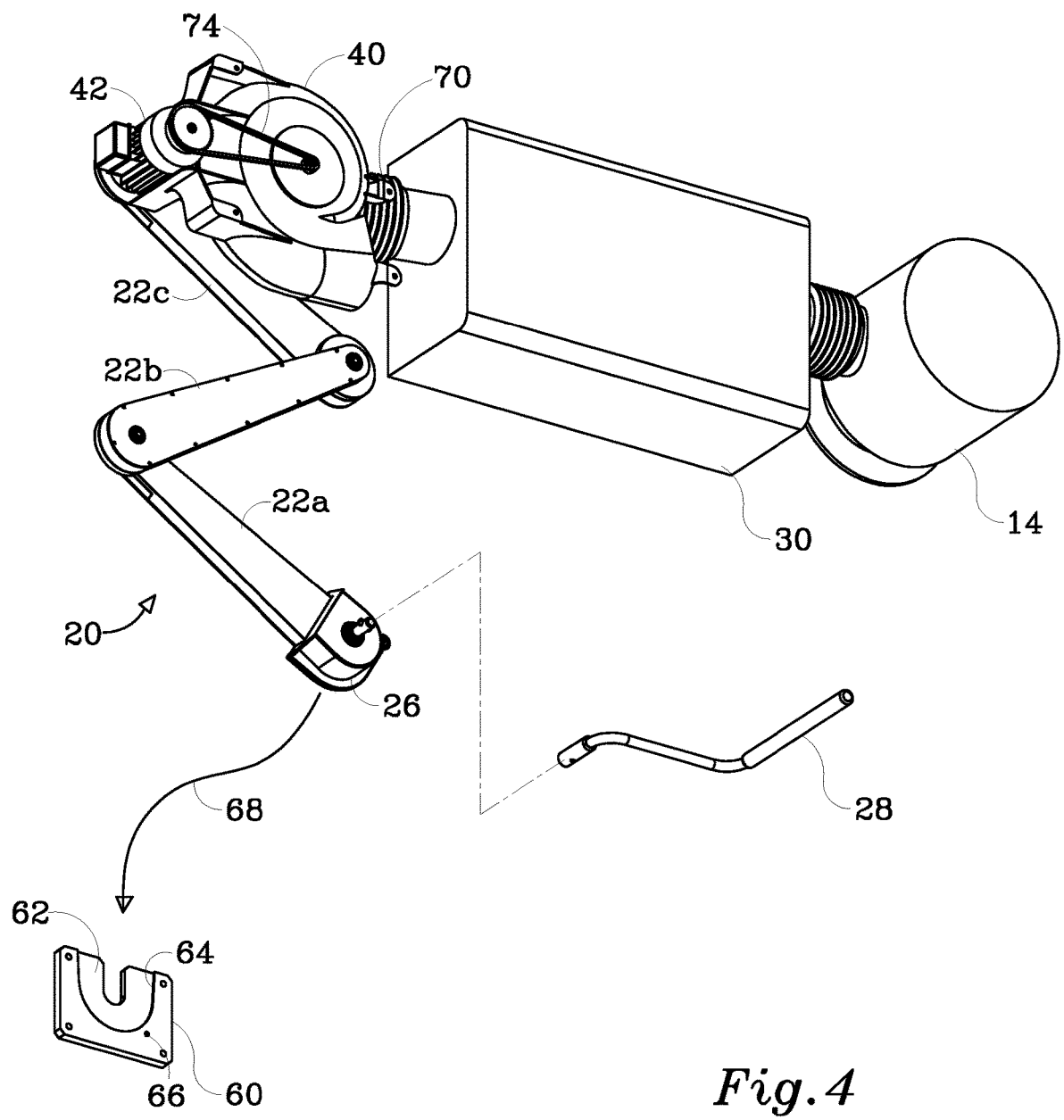
FIG. 4 is a perspective view of the NBC filtration system shown in FIG. 3 with a mounting bracket and cover of the blower removed.

With reference to the figures, according to one embodiment of the invention, there is shown in FIG. 1 a front view of an NBC filtration system for collective protection shelters generally referenced 10. FIG. 2 depicts a perspective view of a similar NBC filtration system with dashed lines representing nearby internal boundary of the protection shelter. Visible in FIGS. 1 and 2, are a prefilter 14, a filter unit 30 and an air exchange backup unit generally referenced 20. The prefilter 14, intended to hold coarse particles, is fitted to an air intake embedded in the concrete wall of the building during construction. The air intake may further include a blast valve as known in the art. The filter unit 30 typically includes a particulate filter and a gas adsorption filter. The filter unit 30 may further include an internal bypass and a change-over valve (not shown) which are out of the scope of the present invention. Further shown in FIG. 4 is a blower 40 airflow coupled to the filter unit 30. The blower 40 is typically covered by a cover 32 serving also as a mounting bracket fixing the blower 40 to the wall of the protection shelter. The air exchange backup unit 20 is mechanically coupled to the blower 40 and manually operated in an event of power failure to power the blower 40 by transmission of rotational motion which rotates an impeller 76 (FIG. 9) of the blower 40.

According to an embodiment, the blower 40 is normally driven by an electric motor 42 as long as electric power is available. The air exchange backup unit 20 may be mechanically coupled to the blower 40 directly, or through the electric motor 42 as will be explained herein below. The air exchange backup unit comprises a plurality of hinged segments, here shown by a way of example with three segments 22(*a, b* and *c*) serially linked to each other. The linked hinged segments forming a foldable arm, shown partially folded in FIGS. 3 and 4.

Figure 5:
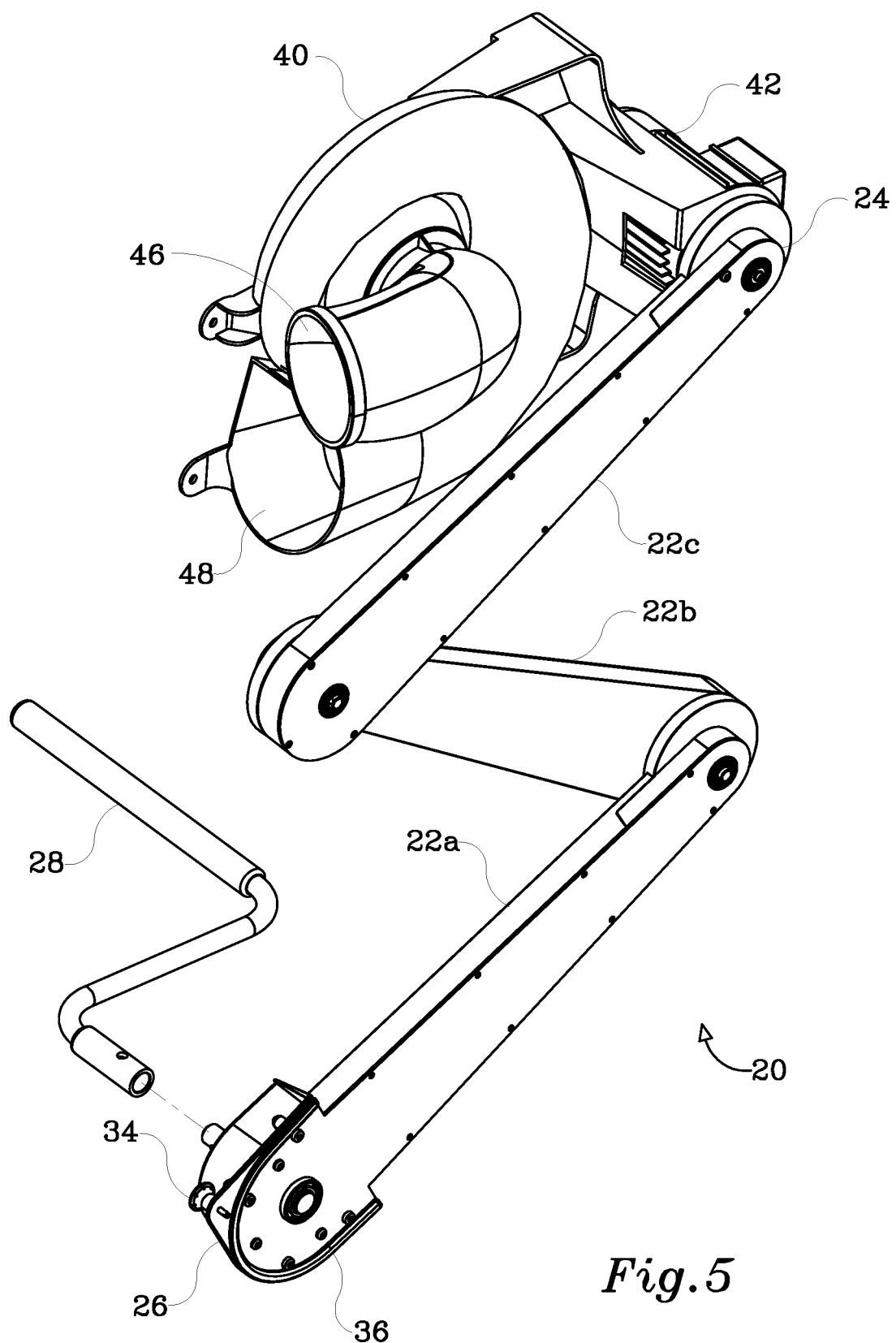
FIG. 5 is a perspective rear view of the air exchange backup unit and blower.

With reference to FIG. 5, a first end 24 of the air exchange backup unit 20 is swiveably attached to the electric motor 42 driving the blower 40. During operation of the air exchange backup unit, in an event of power failure, rotational motion is transmitted from the hand crank 28 through the hinged segments 22(*a, b* and *c*) as will be hereinafter explained, typically through an unidirectional freewheel, to a shaft 44 (FIG. 8) of the electric motor 42.

A second end 26 of the air exchange backup unit 20 carries a detachable hand crank 28. Rotation of the hand crank 28 at normal manual operation of about 40 rpm, rotates the shaft 44 of the electric motor 42 at substantially a rated speed of the electric motor. The second end 26 of the air exchange backup unit 20 is firmly attachable for instance by a dedicated fixed bracket 60 to a wall of the protection shelter at a convenient position for manual cranking of the hand crank. The air exchange backup unit 20 may selectively be folded up at normal times as shown in FIGS. 3 and 4.

Figure 3:
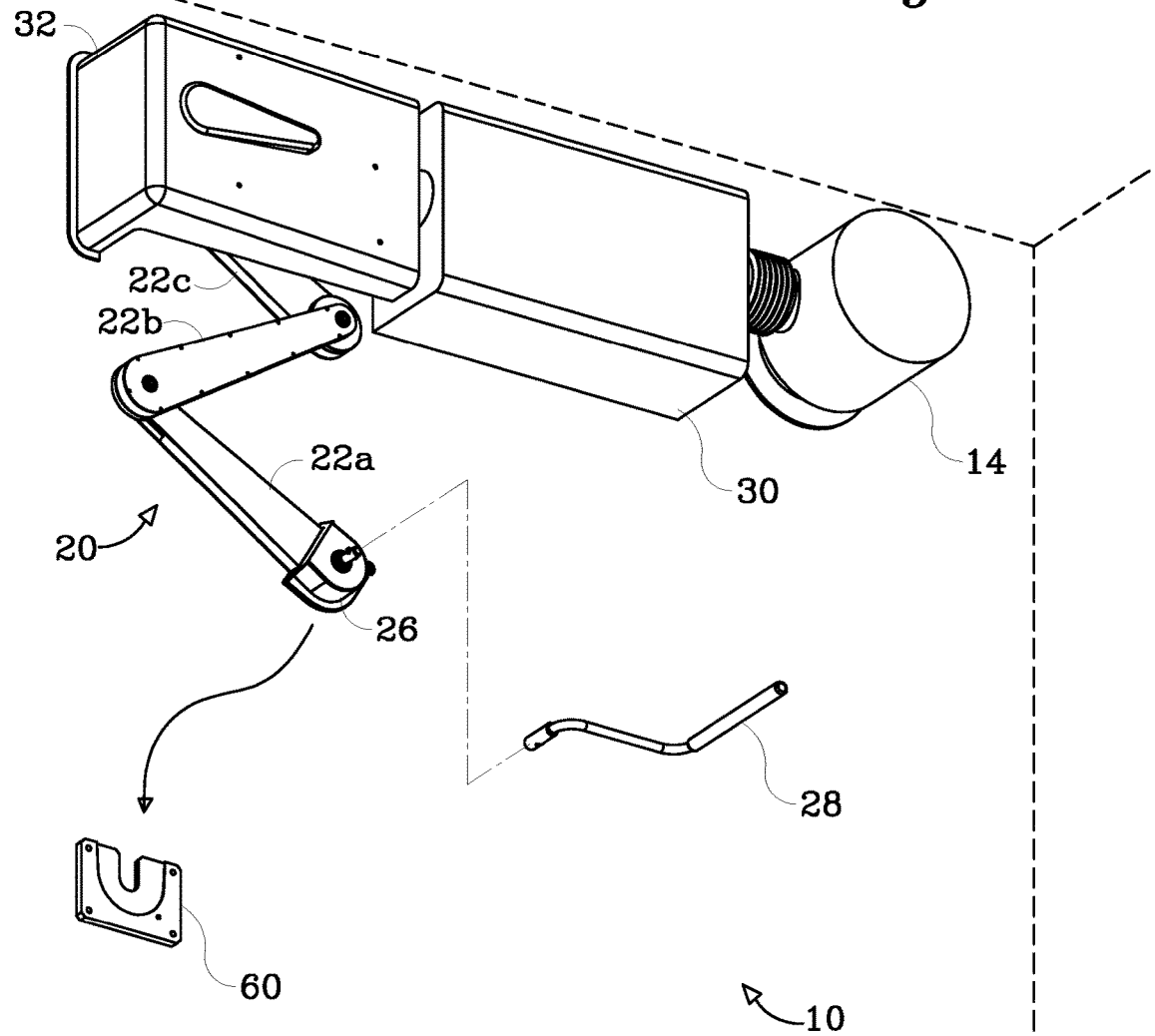
FIG. 3 is a perspective view of the NBC filtration system of FIG. 1, demonstrating the air exchange backup unit halfway folded.

With reference to FIGS. 3 and 4, the air exchange backup unit 20 is shown in a partially folded state, in which the hinged segments 22 are folded about the hinges to form a Z letter shape. It will be understood that the segments may be further folded up to a point where the lower segment 22*a* is in contact with the upper segment 22*c* such that the air exchange backup unit 20 is hidden behind the cover 32 serving also as a mounting bracket of the blower 40. As a result, the air exchange backup unit 20 practically turns invisible to the occupants of the protection shelter. As shown in FIG. 2 the NBC filtration system 10 as a whole is fitted to a wall of the protection shelter near the ceiling. Accordingly, during normal times, when the air exchange backup unit 20 is folded up, the NBC filtration system 10 does not interfere with regular activity taking place in the protection shelter.

As mentioned in the background, in real installations the NBC filtration system is fitted at different locations and different heights. The different locations are enforced by variations in position of the intake pipe between building constructions. The embodiments of the present invention solves this difficulty by simple adaptation of the air exchange backup unit 20 folding arm construction to any installation position. It should be noted that although shown vertically oriented in FIGS. 1 and 2, the air exchange backup unit 20 may compensate for different mounting positions by being partially folded or diagonally fixed to the wall of the protection shelter even during operation at power failure. The above described rotational motion is transmitted from the hand crank 28 through the hinged segments 22(*a, b* and *c*) with the same efficiency in any angular settlement of the hinged segments.

Figure 6:
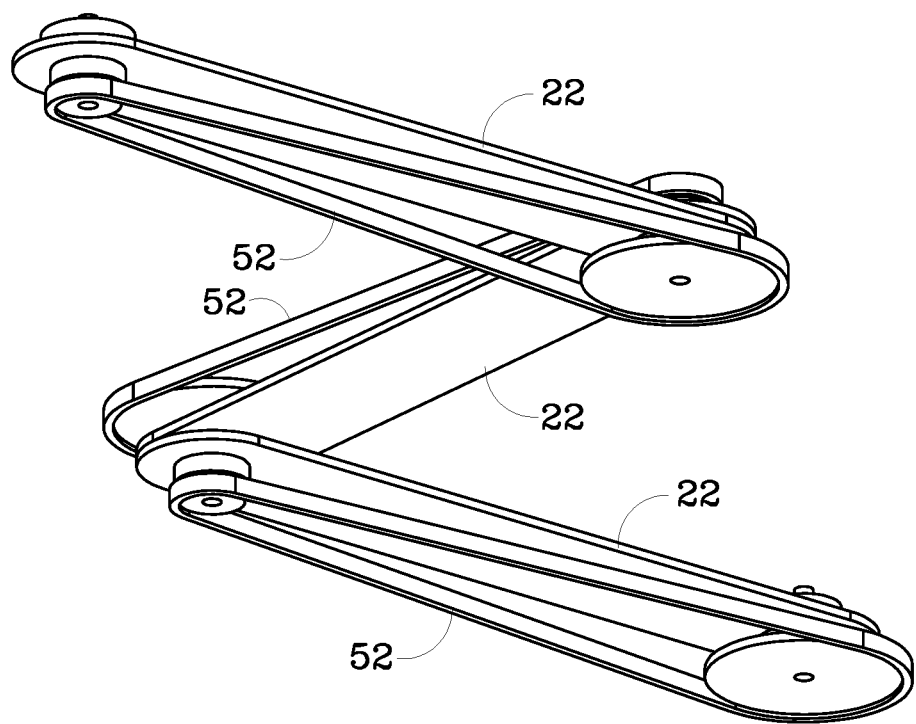
FIG. 6 is perspective schematic view of an open frame type air exchange backup unit.
Figure 7:
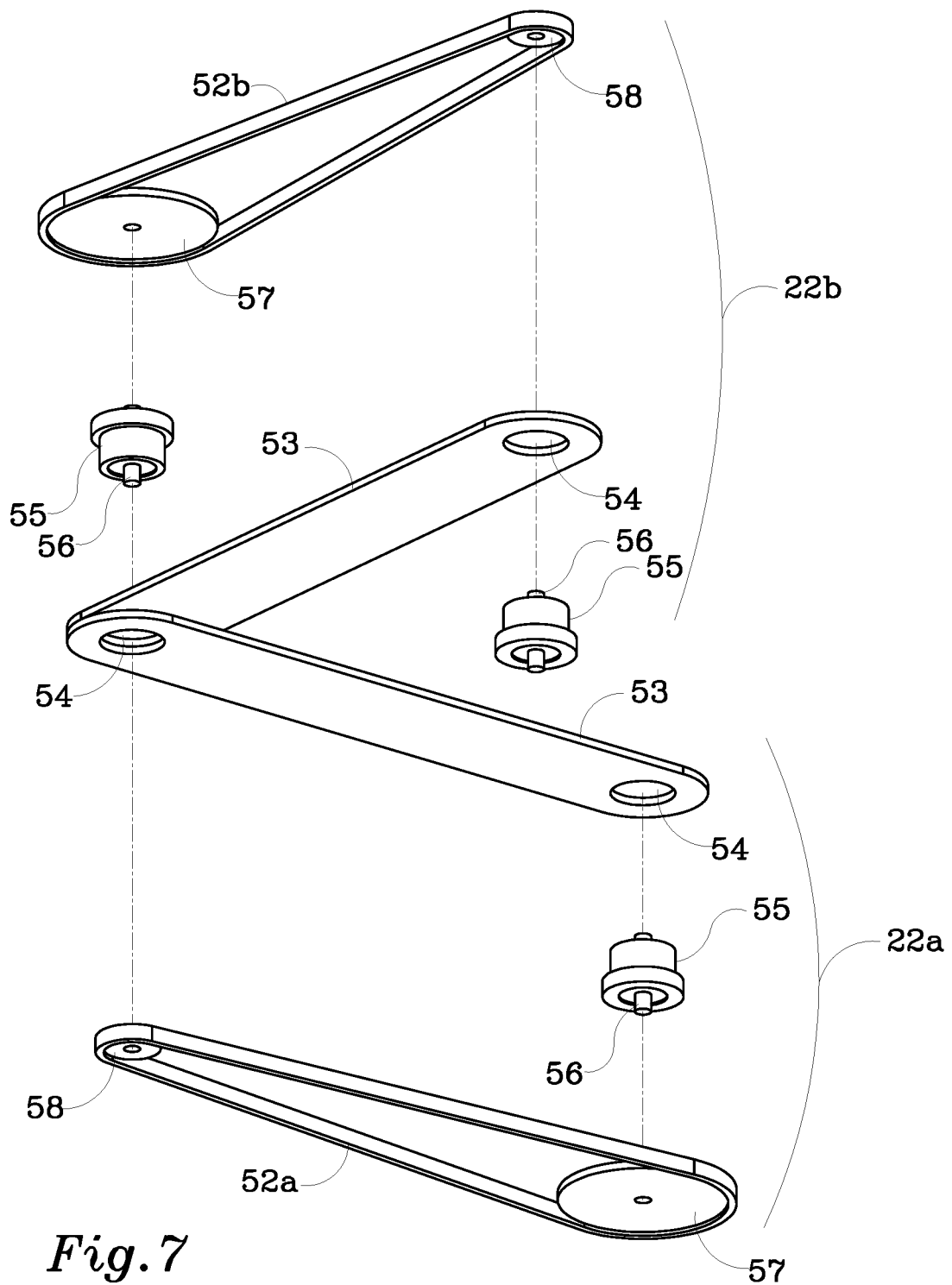
FIG. 7 is an exploded perspective view of two of the segments shown in FIG. 6.

As mentioned above, during operation of the air exchange backup unit 20, in an event of power failure, rotational motion is transmitted from the hand crank 28 through the hinged segments 22 to the electric motor 42. The way of transmittal of the rotational motion will be explained with reference to FIGS. 6 and 7. According to an embodiment there are shown in FIG. 6 three hinged segments 22 linked to each other. The hinged segments use a simple open construction exposing the drive system. Each of the hinged segments 22 is provided with a mechanical drive 52 transmitting rotational motion from one end of the segment to the other end. For example by a pair of sheaves, pulleys or sprockets, each fitted at one end of the segment, rotatively connected by a belt or chain drive. Alternately a pair or plurality of mating gears may be used. Optionally one or all of the mechanical drives 52 may define a transmission ratio or a transmission stage. According to an optional embodiment, at least one of the hinged segments 22 comprises at least one stage of a first speed increasing transmission. Alternately the first speed increasing transmission may be located separately at one end of the air exchange backup unit 20, as will be hereinafter demonstrated.

In addition to the above mechanical drive, transmitting rotational motion from one end of the segment to the other end, the hinged segments 22 are configured for transmission of rotational motion between each other. This is shown with more clarity in FIG. 6, where two segments 22 of FIG. 5 are shown exploded. The structural elements 53 are made as a flat elongated body provided with openings 54 at both ends. An integral shaft bearing 55 (also known as water pump bearing), or a dedicated bearing assembly having a shaft 56 passing through and extending at both sides, is provided to each of the openings 54. The outer diameter of the bearing 55 or the housing of the bearing 55 serves as a hinge linking the structural elements 53. The structural elements 53 are swiveable about the bearing 55, by the bearings 55 having a free fit in the openings 54. A retaining clip may be further provided to hold the bearing 55 in position. Sprockets 57, 58 are fitted to both ends of the shaft 56 of bearing 55. The sprockets 57, 58 may be fixedly fitted to the shaft 56 by a press fit, a key, a flat face, a locking screw or any other locking element that prevents free rotation of the sprockets 57, 58 about the shaft 56. As a result, the shaft 56 is transmitting rotational motion between sprocket 58 fitted to one end of the shaft 56 and sprocket 57 fitted to the other end of the shaft 56. Sprocket 58 is driven by mechanical drive 52*a* of segment 22*a* as described above. And Sprocket 57 is driving the mechanical drive 52*b* of segment 22*b*. It will be noted that the shaft 56 shares the same axis as the hinge between the segments 22*a*, 22*b* defined by bearing 55. Accordingly, each of the hinges pairing the hinged segments 22(*a, b* and *c*) (FIG. 6), is provided with a rotatable shaft 56 transmitting rotational motion from one segment to the other and sharing the same axis as the hinge axis. The shaft 56 transmitting rotational motion between the segments 22(*a, b* and *c*). The ratio between diameter or teeth number of sprockets 57 and 58 indicates the speed increasing amount of each stage or mechanical drive of each segment.

FIG. 5, depicts a perspective rear view of the air exchange backup unit 20 and blower 40 taken out of the NBC filtration system. The air exchange backup unit generally referenced 20 is shown halfway folded. The second end 26 of the air exchange backup unit 20 is provided with a circumferential protrusion 36 and a locking pin 34. The second end 26 may be firmly attached to the dedicated fixed bracket 60 (FIG. 4), by engagement of the circumferential protrusion 36 into a compatible pocket 62 provided with circumferential recess 64 of the dedicated fixed bracket 60. The locking pin 34 may be engaged into a locking hole 66 of the bracket 60 to prevent movement of the second end 26 of the air exchange backup unit 20, during operation of the hand crank 28. The route of directing the second end 26 of the air exchange backup unit 20 into the fixed bracket 60 is demonstrated by an arrow marked 68 (FIG. 4). It will be understood that other means for firmly attaching the second end 26 of the air exchange backup unit 20 to a wall of the protection shelter may be provided. Such other means may include a mortise and tenon, hand operated fasteners, lever latching fasteners, cone couplers and other known means.

With reference to FIGS. 4 and 5, a suction port 46 of the blower 40 is airflow coupled to the filter unit 30 through a flexible duct 70. The blowout port 48 of blower 40, is open to the space of the protection shelter such that filtered air is spread into the space without restriction. The blower 40 is driven by the electric motor 42 either directly or through a second speed increasing transmission 74 as shown in FIG. 4. For economic and long term reliability reasons a standard 4-pole induction motor 42 may be preferable.

Figure 8:
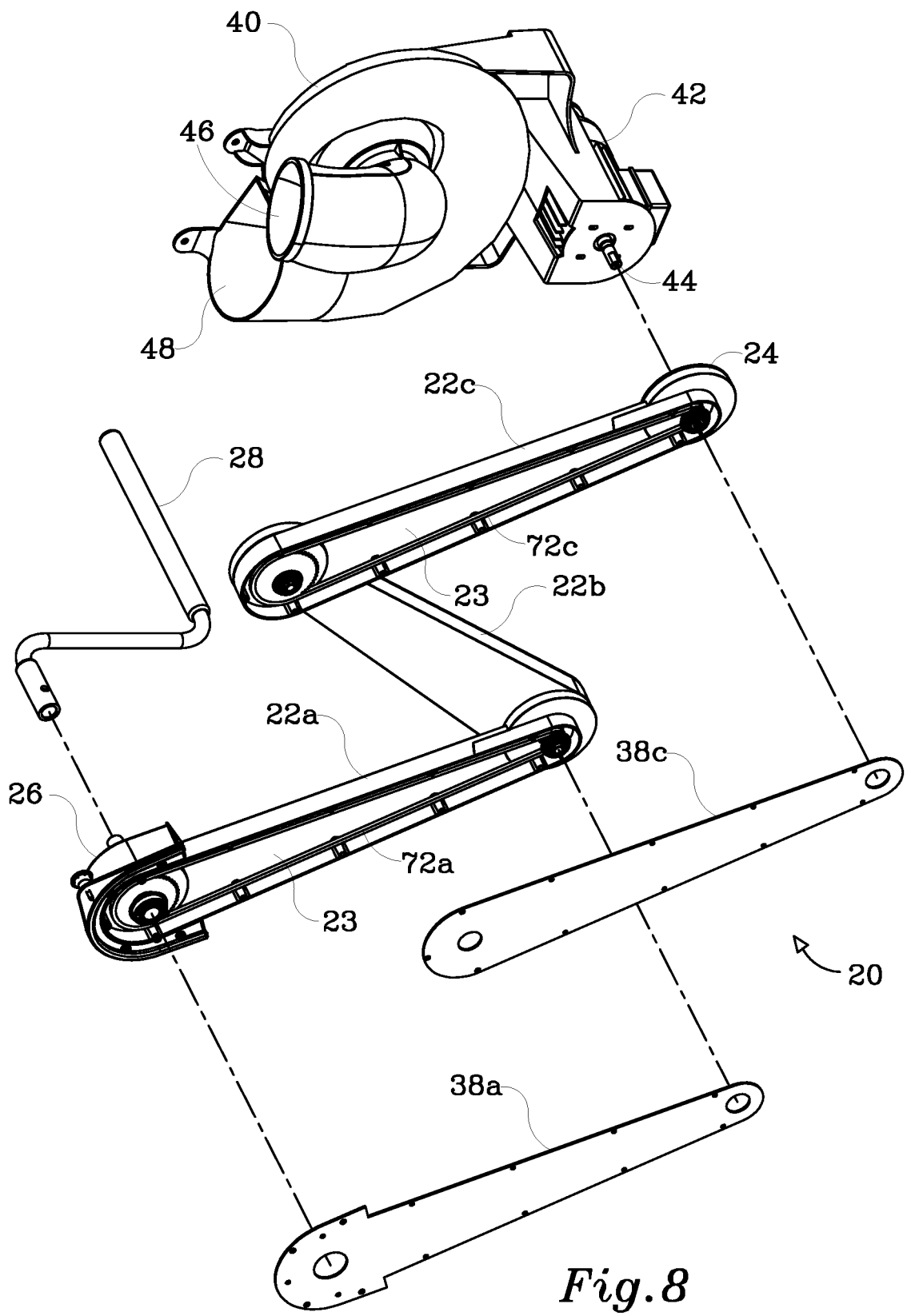
FIG. 8 is an exploded perspective view of the air exchange backup unit and blower of FIG. 5.

With reference to FIG. 8, the blower 40 and motor 42 are moved from position in relation to the air exchange backup unit 20. Covers 38*a* and 38*c* of segments 22*a* and 22*c* respectively are also moved from position to expose transmission stages 72*a* and 72*c* of the first speed increasing transmission of air exchange backup unit generally referenced 20. It will be noted that according to the embodiment the structural elements are made with a cavity 23 and provided with a cover 38 protecting the user from contact with moving drive elements. According to the embodiment, each of the hinged segments 22 is provided with a mechanical drive 72(*a, b* and *c*) transmitting rotational motion from one end of the segment to the other end. According to the shown embodiment, each of the hinged segments 22(*a, b* and *c*) includes one stage of the first speed increasing transmission of the air exchange backup unit 20.

Figure 9:
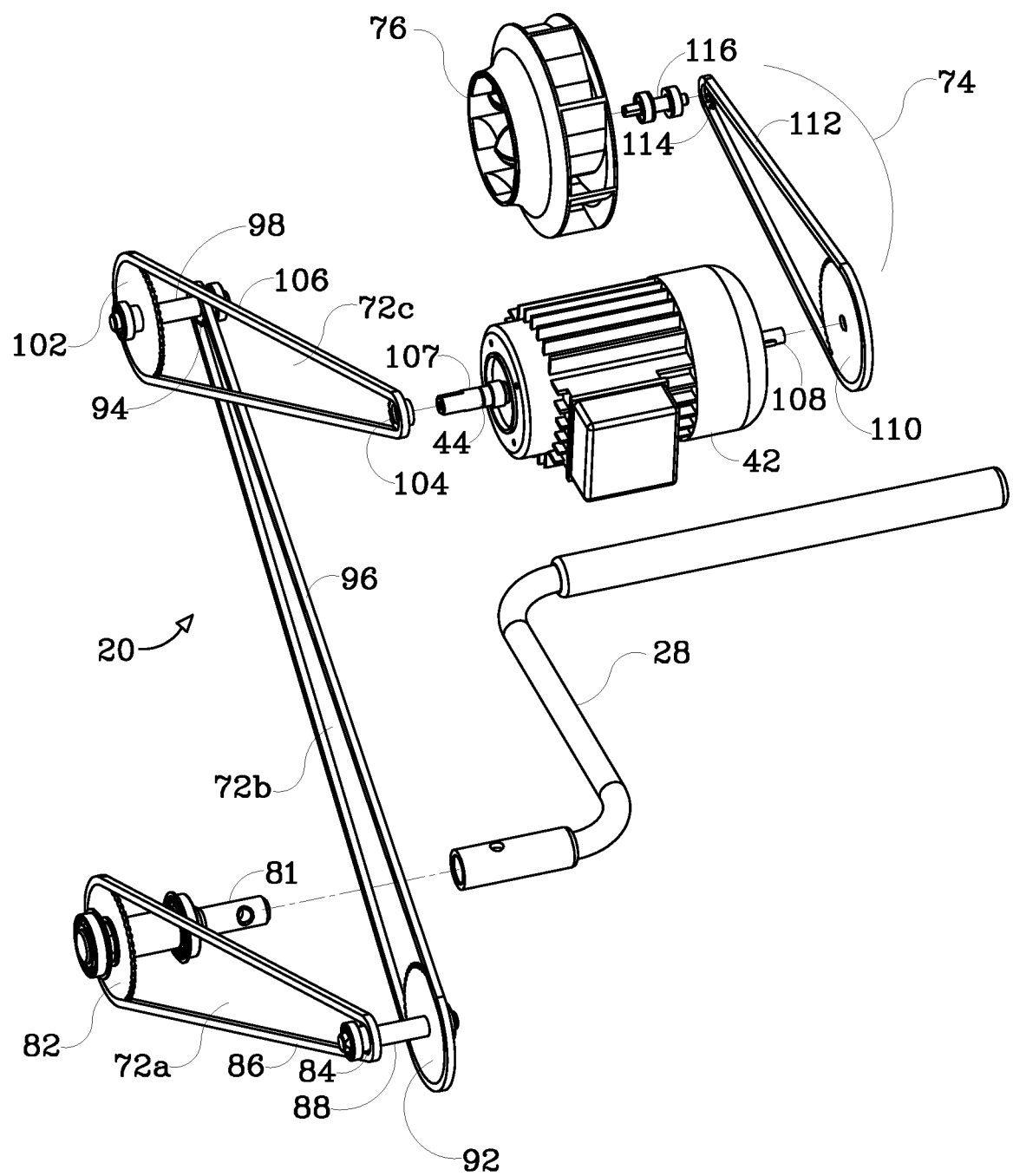
FIG. 9 is a perspective skeleton view demonstrating the electrical and manual drive systems of the blower and the air exchange backup unit.

With reference to FIG. 9, an air exchange backup unit is shown with the structural elements removed, exposing the transmission elements. According to an embodiment, the first speed increasing transmission is configured as a roller chain drive including 3 stages 72(*a,b* and *c*). Each of the links pairing the hinged segment 22(*a, b* and *c*) is provided with a rotatable shaft 88, 98 sharing the same axis as the hinge axis. Obviously any other number of hinged segments and transmission stages may be used, however for reason of efficiency, the optimal number is the minimum number that delivers the desired speed increasing ratio. The pitch size of the roller chain drive is selected between 6 mm and 10 mm. It will be understood that the different stages of the first speed increasing transmission may accept different pitch size due to the different moment and rotational speed related to each of the stages.

In more detail, yet with reference to FIG. 9, during manual operation of the hand crank 28 in an event of power failure, a first sprocket 82 is directly rotated by the hand crank 28 through an input shaft 81. The first sprocket 82 rotates a second sprocket 84 preferably smaller than the first sprocket 82, via a first drive chain 86. The first sprocket 82, first drive chain 86 and second sprocket 84 are forming together the first stage 72*a* of the first speed increasing transmission of air exchange backup unit 20. As shown in FIG. 9, the second sprocket 84 is mounted on one end of a first intermediate shaft 88 defining also a hinge axis between the first segment 22*a* and the second segment 22*b* of the foldable arm constituting the air exchange backup unit 20. A third sprocket 92 is mounted on the other end of the first intermediate shaft 88, thus accepting the same rotational speed as the second sprocket 84.

The third sprocket 92 rotates a forth sprocket 94 preferably smaller than the third sprocket 92, via a second drive chain 96. The third sprocket 92, second drive chain 96 and fourth sprocket 94 are forming together the second stage 72*b* of the first speed increasing transmission of air exchange backup unit 20. The fourth sprocket 94 is mounted on one end of a second intermediate shaft 98 defining also a hinge axis between the second segment 22*b* and the third segment 22*c* of the foldable arm constituting the air exchange backup unit 20. A fifth sprocket 102 is mounted on the other end of the second intermediate shaft 98, thus accepting the same rotational speed as the fourth sprocket 94.

The fifth sprocket 102 rotates a last sprocket 104 preferably smaller than the fifth sprocket 102, via a third drive chain 106. The fifth sprocket 102, third drive chain 106 and last sprocket 104 are forming together the third stage 72*c* of the first speed increasing transmission of air exchange backup unit 20.

The last sprocket 104 is fitted to a first end 107 of the motor shaft 44 through an unidirectional freewheel also known as freewheel clutch or freewheel bearing. The unidirectional freewheel permits rotation of the motor shaft 44 by the air exchange backup unit 20, but prevents rotation of the first speed increasing transmission elements by freewheeling when the motor is electrically energized. It will be understood that different types of unidirectional or clutch mechanisms can be used alternately, for instance a ratchet mechanism or a wound spring mechanism as known in the art.

Yet with reference to FIG. 9, The second speed increasing transmission 74, if applicable, comprises a first sprocket 110 fixed to a second end 108 of the motor shaft 44, a drive chain 112, and a second sprocket 114, smaller than the first sprocket 110. The second sprocket 114 of the second speed increasing transmission 74 is fitted to a first end of a blower shaft 116. The second end of the blower shaft 116 carries an impeller 76 of the blower 40.

The second speed increasing transmission 74 driving the blower 40 is capable of driving the impeller 76 of the blower at a rotational speed of above 3000 rpm using a motor 42 of the known 4-pole induction type. To minimize transmission losses, the second speed increasing transmission 74 may be a low friction, efficient drive system selected between some options including: a multi-groove V belt drive, toothed belt drive, a roller chain drive or an inverted tooth chain drive also known as silent chain. Due to the high speed and low torque of this second speed increasing transmission, if a roller chain drive or a silent chain drive is utilized, than the pitch size is selected between 3 mm and 6 mm. It will be understood that other transmission types can be used such as direct gear drive, single or multiple V belt drive, flat belt drive and ladder chain drive.

Figure 10:
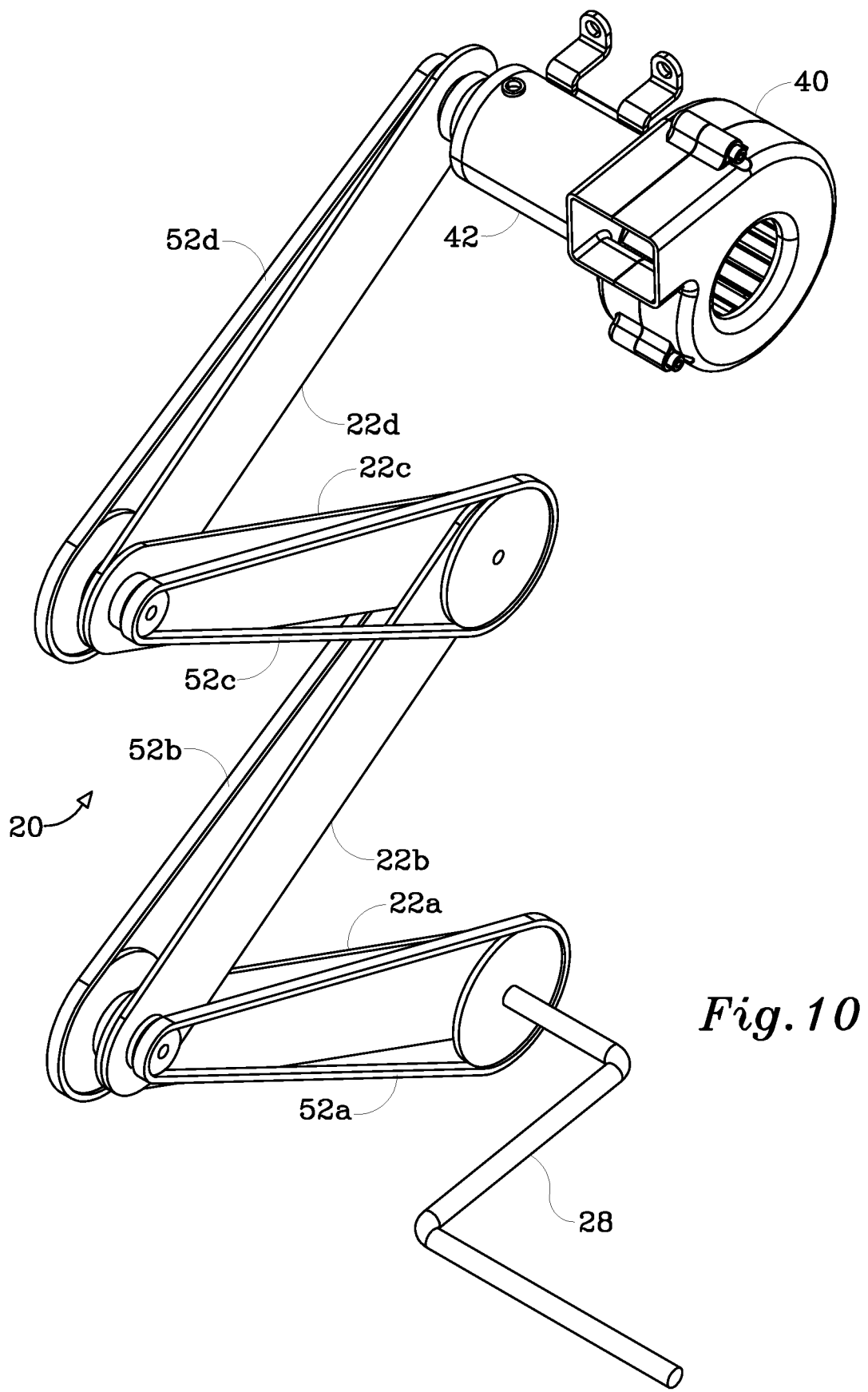
FIG. 10 is a perspective view of an air exchange backup unit made according to another embodiment of the invention.

With reference to FIG. 10 there is shown a different embodiment where four segments 22(*a, b, c* and *d*) are used. Each of the segments is provided with one stage 52(*a, b, c* and *d*) of the first speed increasing transmission. Due to a possible higher overall transmission ratio than that of the three segment construction, there is no need for a second speed increasing transmission and a motor 42 of rated speed preferably higher than 3000 rpm is directly driving the blower 40. The air exchange backup unit 20 is driving the other end of the shaft of motor 44, in an event of power failure and manual operation of the hand crank 28.

Figure 11:
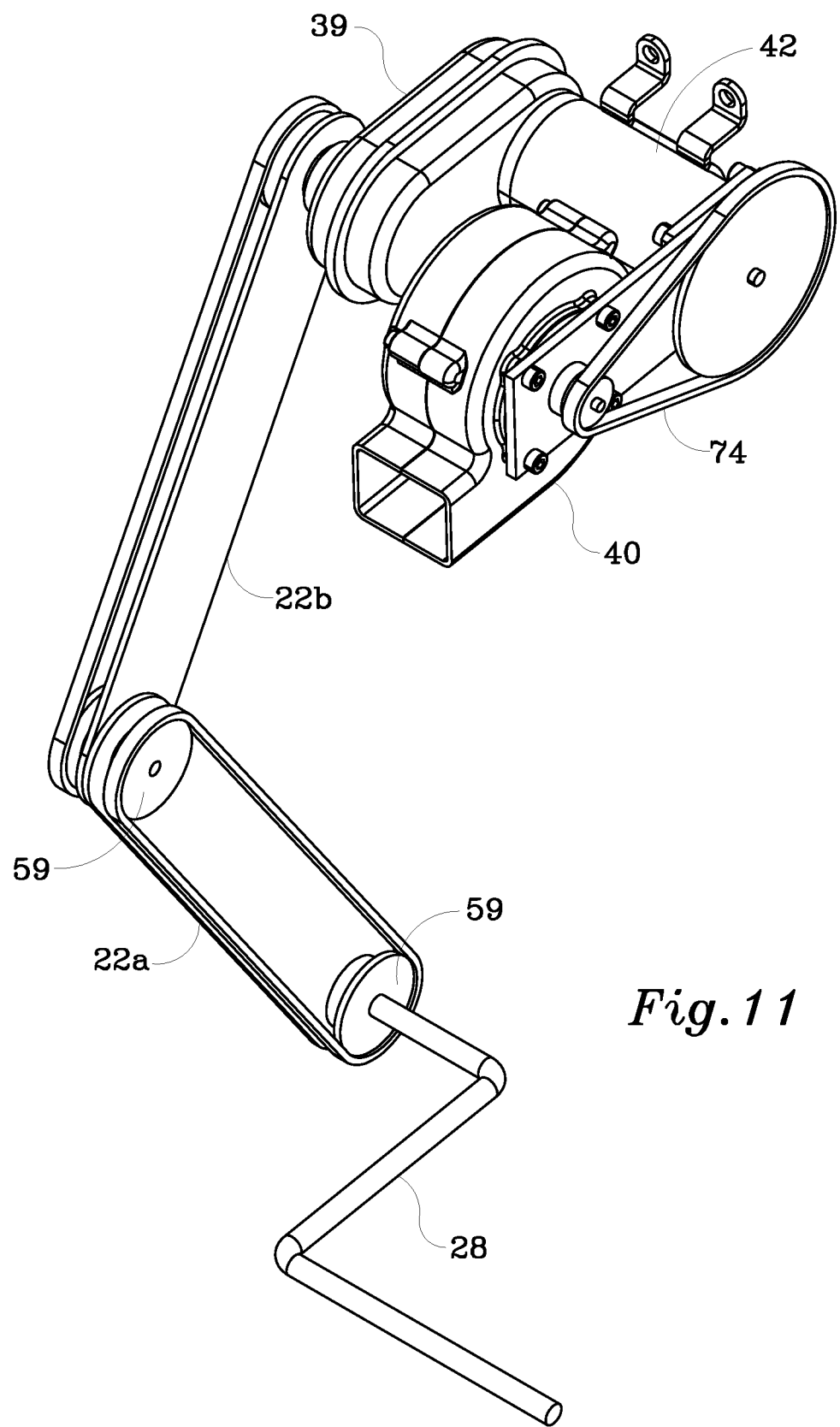
FIG. 11 is a perspective view of an air exchange backup unit made according to yet another embodiment of the invention.

With reference to FIG. 11 there is shown an additional embodiment where only two segments 22*a* and 22*b* are used. As shown in the embodiment of FIG. 11, the sprockets 59 at both ends of each segment 22*a* and 22*b* are of the same size. Accordingly there is no speed increasing in the air exchange backup unit 20. For the speed increasing task there is provided a dedicated speed increasing transmission 39 which is fitted between the air exchange backup unit 20 and the motor 42. It will be understood however that any combination of speed increasing transmission stages may be used. The air exchange backup unit 20 may be provided with certain first speed increasing ratio while the dedicated speed increasing transmission 39 provides an additional second speed increasing ratio calculated to provide the overall required speed increasing ratio.

The present invention seeks protection regarding the device as described above, as well as the method steps taken to accomplish the desired result of introducing fresh air into the protection shelter during an event of a power failure, using a near ceiling mounted NBC filtration system and an air exchange backup unit of a foldable arm structure.

Figure 12:
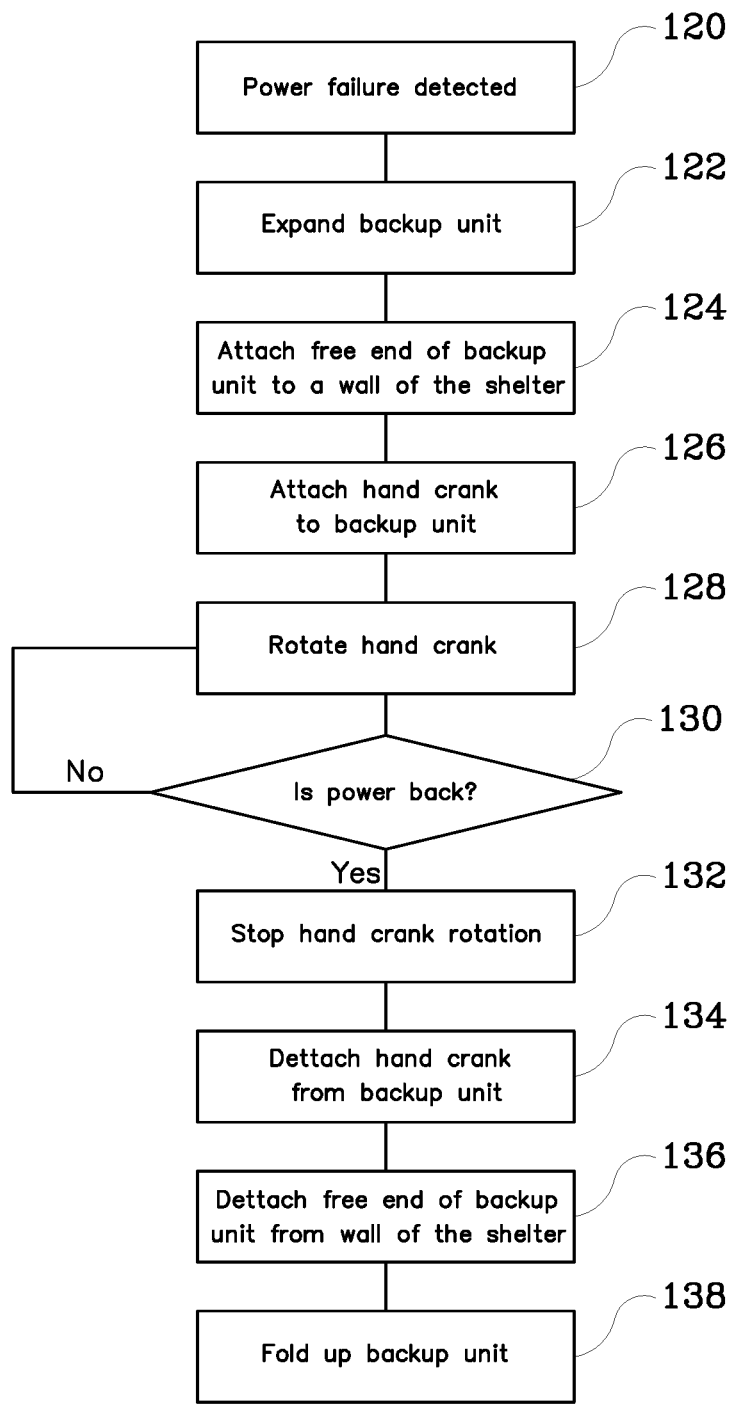
FIG. 12 is a flowchart demonstrating a method of operation of the NBC filtration system.

Accordingly and with reference to FIG. 12, a method is provided comprising one or more of the steps below:

a. Providing a near ceiling mounted NBC filtration system comprising: a filter unit; a blower driven by an electric motor; an air exchange backup unit having a first end swiveably attached to the electric motor; and a detachable hand crank selectively fitted to a second end of the air exchange backup unit. The air exchange backup unit comprising a plurality of hinged segments serially linked to each other to form a foldable arm. The hinged segments are configured for transmission of rotational motion between each other.

b. Expanding the air exchange backup unit in an event of a power failure. Indicated as activities 120 and 122 of the flowchart of FIG. 12.

c. Attaching the second end of the air exchange backup unit to a wall of a protection shelter at a convenient position for manual cranking of the hand crank. Indicated as activity 124 of the flowchart.

d. Attaching the detachable hand crank to the second end of the air exchange backup unit. Indicated as activity 126 of the flowchart.

e. Cranking the hand crank while said power failure continues. Indicated as activity 128 and decision 130 of the flowchart.

The method may further include the steps of:

f. Stopping the cranking operation when electric power is revived. Indicated as activity 132 of the flowchart.

g. Detaching the detachable hand crank from the second end of the air exchange backup unit. Indicated as activity 134 of the flowchart.

h. Detaching the second end of the air exchange backup unit from the wall of the protection shelter. Indicated as activity 136 of the flowchart.

i. Folding up the air exchange backup unit. Indicated as activity 138 of the flowchart.

It will be understood that while activities 120 to 128 of the flowchart are required to start manual operation of the air exchange backup unit, the following activities 132 to 138 are optional or may be carried out at a later time or by a dedicated maintenance person that may further check the system before bringing it back to the folded state.

It will be appreciated that the specific embodiments of the present invention described above and illustrated in the accompanying drawings are set forth merely for purposes of example. Other variations, modifications, and applications of the present invention will readily occur to those skilled in the art. It is therefore clarified that all such variations are considered within the scope and spirit of the invention. Accordingly, the protection sought herein is as set forth in the claims below.

The invention claimed is:

1. An NBC filtration system comprising:
a filter unit;
a blower having a suction port, the suction port being airflow coupled to said filter unit; and
an air exchange backup unit mechanically coupled to said blower; said air exchange backup unit having a plurality of hinged segments serially linked to each other to form a foldable arm, said plurality of hinged segments being configured for transmission of rotational motion between each other, a first end of said air exchange backup unit driving said blower and a second end of said air exchange backup unit carrying a detachable hand crank, whereby manual rotation of said hand crank transfers rotational motion between said plurality of hinged segments to rotate an impeller of said blower;
wherein said NBC filtration system is mounted at a near ceiling position and said air exchange backup unit can be folded up.

2. An NBC filtration system as claimed in claim 1, wherein each of said plurality of hinged segments is provided with a mechanical drive transmitting rotational motion from one end of each hinged segment to an opposite end of the same hinged segment.

3. An NBC filtration system as claimed in claim 1, wherein each link pairing two of said plurality of hinged segments are provided with a rotatable shaft transmitting rotational motion from one segment to the other.

4. An NBC filtration system as claimed in claim 1, wherein at least one of plurality of said hinged segments further comprises at least one stage of a first speed increasing transmission.

5. An NBC filtration system as claimed in claim 4, wherein said first end of said air exchange backup unit is swiveably attached to an electric motor driving said blower, manual rotation of said hand crank rotates a shaft of said electric motor at a rated speed of said electric motor.

6. An NBC filtration system as claimed in claim 1, wherein said second end of said air exchange backup unit is attachable to a wall of a protection shelter at a position for manual cranking of said hand crank.

7. An NBC filtration system as claimed in claim 5, wherein said electric motor drives said blower through a second speed increasing transmission.

8. An NBC filtration system as claimed in claim 7, wherein said second speed increasing transmission is capable of driving the impeller of said blower at a rotational speed of above 3000 rpm.

9. An NBC filtration system as claimed in claim 5, wherein said electric motor driving said blower is a 4-pole induction motor.

10. An NBC filtration system as claimed in claim 7, wherein said second speed increasing transmission is selected from a group consisting of: a multi groove V belt drive; a toothed belt drive; a roller chain drive; and an inverted tooth chain drive.

11. An NBC filtration system as claimed in claim 10, wherein a pitch size of said roller chain drive or said inverted tooth chain drive is selected between 4 mm and 6 mm.

12. An NBC filtration system as claimed in claim 4, wherein each of said plurality of hinged segments comprises one stage of said first speed increasing transmission.

13. An NBC filtration system as claimed in claim 12, wherein said first speed increasing transmission comprises 3 stages of a roller chain drive.

14. An NBC filtration system as claimed in claim 13, wherein a pitch size of said roller chain drive is selected between 6 mm and 10 mm.

15. An NBC filtration system as claimed in claim 5, wherein during operation, said first speed increasing transmission transmit rotational motion to said electric motor through an unidirectional freewheel fitted to a shaft of said electric motor.

16. An NBC filtration system as claimed in claim 13, wherein a first intermediate shaft of said first speed increasing transmission defines also a hinge axis between a first segment and a second segment of said air exchange backup unit, and a second intermediate shaft of said first speed increasing transmission defines also a hinge axis between said second segment and a third segment of said air exchange backup unit.

17. An NBC filtration system as claimed in claim 1, wherein said air exchange backup unit comprises four segments, each of said plurality of segments is provided with one stage of a first speed increasing transmission, the four segments providing an overall transmission ratio, sufficient for driving the impeller of the blower.

18. An NBC filtration system as claimed in claim 1, wherein said air exchange backup unit comprises two segments, and a dedicated speed increasing transmission is fitted between the air exchange backup unit and said electric motor.

19. An NBC filtration system as claimed in claim 18, wherein said air exchange backup unit is provided with a first speed increasing ratio while said dedicated speed increasing transmission provides a second speed increasing ratio, the first and second speed increasing ratios being calculated to provide an overall speed increasing ratio to rotate said electric motor at a rated speed of said electric motor.

* * * * *